June 3, 1930.  I. T. WEDIN  1,761,947
PRESSURE GAUGE
Filed Jan. 30, 1930
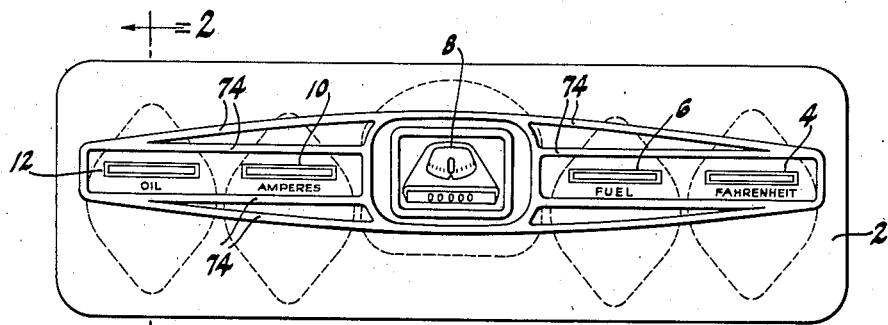
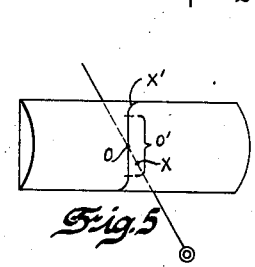
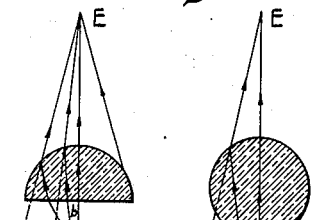
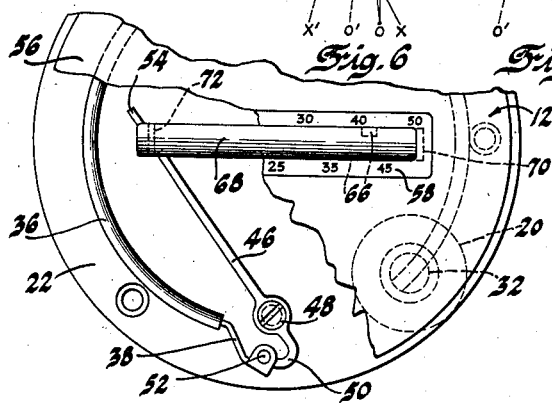
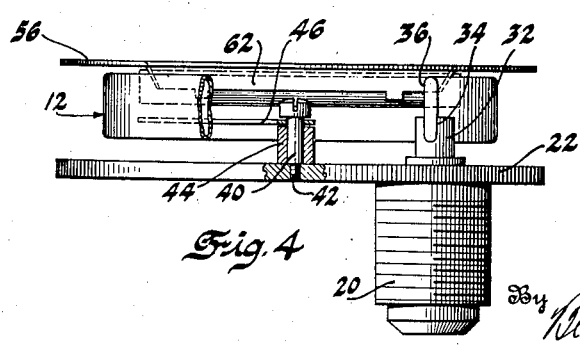
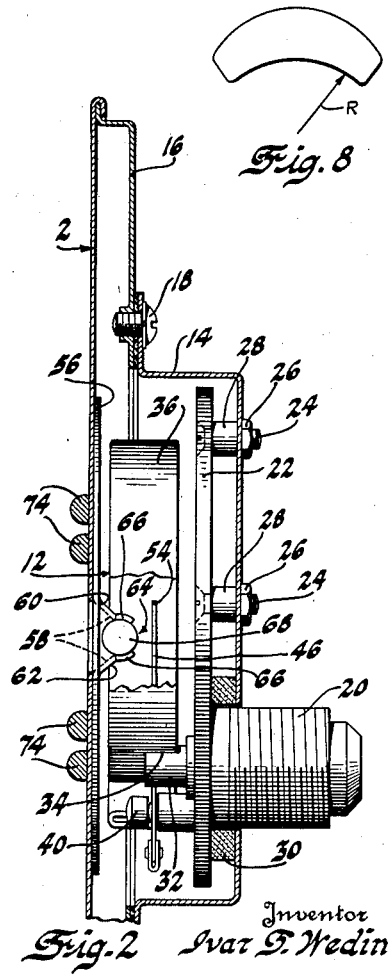
Inventor
Ivar T. Wedin Patented June 3, 1930

1,761,947

UNITED STATES PATENT OFFICE

IVAR T. WEDIN, OF FLINT, MICHIGAN, ASSIGNOR TO A C SPARK PLUG COMPANY, OF FLINT, MICHIGAN, A COMPANY OF MICHIGAN

PRESSURE GAUGE

Application filed January 30, 1930. Serial No. 424,611.

This invention relates to gauges and has particular reference to a gauge of the Bourdon tube type although the novel features of the invention are applicable to any gauge which has a movable pointer.

In prior gauges using a swinging pointer use has almost invariably been made of a graduated arcuate dial over which the pointer swings. In the present invention, the dial is arranged in a straight line and the pointer swings on an arc beneath the dial. When the pointer (or an oblique line) is viewed through a convex cylindrical crystal or lens there is an apparent straightening effect provided the line under inspection is supported at or near one conjugate focal point of the crystal when the eye is at the other focal point.

The scale of the dial of the invention is formed on the side of a slotted opening in which there is secured a curved or rounded transparent column preferably formed of glass. The slot is formed by inwardly bending portions of the dial away from each other. The inwardly bent portions have tongues which are slightly rounded, the glass column being received in the rounded tongues and held in position by the tongues and inwardly bent portions. The glass column is preferably longer than the slot so that it extends at both of its ends beyond the ends of the slot.

The gauge is particularly adaptable for use on automotive vehicles for measuring the oil pressure and is usually positioned at the instrument board.

On the drawing:

Figure 1 is a front elevational view of the instrument board of an automotive vehicle showing the gauge of the invention applied thereto.

Figure 2 is an enlarged sectional detailed view on the line 2—2 of Figure 1.

Figure 3 is a front view of the gauge separated from the instrument board with parts broken away for purposes of clearer illustration.

Figure 4 is a side view of Figure 3 with parts shown in section.

Figures 5, 6 and 7 are views showing diagrammatically the operation of the glass column.

Figure 8 is a view of a modified form of crystal or lens.

Referring to the drawing, the numeral 2 indicates the instrument panel of an automotive vehicle. The temperature gauge is indicated at 4, the fuel gauge at 6, the speedometer and odometer at 8, the ammeter at 10, and the oil gauge at 12. The structure of the gauges 4, 6, 8 and 10 may be of any suitable type and they per se form no part of the invention.

The particular novelty of the invention resides in the oil gauge 12 which is better illustrated in Figures 2, 3 and 4. The gauge 12 has the casing 14 secured to the instrument board 2 by means of the rear plate 16 and the machine bolts 18. In the casing 14, a stud 20 is mounted and a frame 22 is rigidly secured to the stud. The frame 22 is connected to the casing by means of the machine screws 24 and nuts 26, spacers 28 being provided to space the frame 22 from the casing 14. A felt or other fabric ring 30 is preferably provided around the socket 20 between the frame 22 and the back of the casing 14.

The inner portion 32 of the stud 20 is slotted as at 34 and in the slot there is received one end of a Bourdon tube 36 the interior of which is in communication with a bore in the stud 20. The other end of the Bourdon tube 36 is free and has the arm 38 secured thereto.

The frame 22 has mounted therein the stud 40 screw-threaded into the base as at 42. A spacing collar 44 surrounds the stud 40 and a pointer 46 is pivoted to the stud as at 48. One end of the pointer 46 is formed into a goose-neck portion 50 which is pivoted as at 52 to the end of the arm 38. The opposite end 54 of the pointer is free and is preferably colored and is adapted to swing beneath the dial plate 56 which is preferably positioned against the rear side of the instrument panel 2 as is best shown in Figure 2.

The dial 56 has the scale 58 thereof positioned in a straight line and is shown in a horizontal position on the drawing. It is of course obvious that the scale 58 may be vertically positioned or placed at any desired angle by rotating the instrument 12 as a whole.

The scale 58 is formed by inwardly pressing two wing portions 60 and 62 from substantially the mid portion of the dial. The dial is first given a longitudinal cut and the two wing portions are then inwardly bent as shown in Figures 2, 3 and 4, leaving the slot 64 therebetween. The innermost portions of the wings 60 and 62 have rounded tongues as indicated at 66 two pairs being used, the purpose of which is to receive and hold the transparent column 68 preferably formed of glass. The column 68 is somewhat longer than the length of the slot 64 as indicated by the dotted lines 70 in Figure 3. This larger over-all length of the transparent column 68 permits both ends thereof to extend beyond the slot. This will aid in holding the glass column 68 more securely in position.

Owing to the fact that the glass column 68 is curved or rounded (preferably circular) in transverse cross section, the visible part of the end 54 of the pointer 46 will appear as a straight line as indicated by the dotted lines 72 in Figure 3 when the pointer end (which is preferably colored) is viewed from in front of the glass.

The laws of light refraction specify that a ray of light in passing from a rarer to a denser medium is bent towards the normal, and away from the normal when passing out into a rarer medium. For this reason the light beam (b) in Figures 6 and 7 coming from the point O will appear to the eye E as if it came from O' and x from x'. The point O is highly magnified in a direction perpendicular to the axis of the crystal and therefore appears to be stretched out to a length O', Figure 5.

If the crystal used is a true cylinder or a section of a cylinder as those shown in Figures 5, 6 and 7 the edges of the cylinder produce too much straightening effect and the ends of the line are bent in opposite directions as in Figure 5. A point x will appear at x'. This is not necessarily a disadvantage for the invention under consideration because in mounting the crystals in actual production the edges of the crystal may be covered by supporting members.

There are undoubtedly an unlimited number of crystal shapes which would produce the proper results under a given set of conditions. Figure 8 shows a concavo-convex crystal which will give a true straight line over its entire width and in this respect is an improvement over the cylindrical type lens. For the sake of simplicity the under side of the crystal has a true radius R and therefore no refraction will take place at this surface.

If desired, the entire inward end of the two portions 60 and 62 may be formed into a rounded portion 66, but in practice it is preferred to use only the staggered tongue portions 66 as previously described, a portion of the ends of the wings at both sides of the tongues being cut away.

The front face of the instrument panel is preferably provided with the beading indicated at 74 for purposes of ornamentation. This beading is preferably pressed from the panel but may be separately attached.

If desired, the goose-neck portion 50 may be placed on the opposite side of the pivot 48 and the pointer 46 caused to swing in the opposite direction. The scale of course will then read in the opposite direction.

I claim:

1. In a gauge, a pointer, means for moving said pointer, and a rounded transparent column mounted on the gauge over the pointer.

2. In a gauge, a pointer, means for moving said pointer, a dial, and a rounded transparent column mounted on the dial and over the pointer.

3. In a gauge, a pointer, means for moving said pointer, a dial having a slot, and a rounded transparent column mounted over the slot on the dial and over the pointer.

4. In a gauge, a pointer mounted to swing on a pivot, means for moving said pointer, a dial having a slot beneath which the end of the pointer is adapted to swing, and a rounded transparent column mounted in said slot.

5. In a gauge, a pointer mounted to swing on a pivot, means for moving said pointer, a dial having portions pressed from its face forming a slot therebetween, and a rounded transparent column mounted in said slot and held by said pressed portions, said pointer swinging beneath said column.

6. In a gauge, a pointer mounted to swing on a pivot, means for moving said pointer, a dial having portions pressed from its face inwardly of the gauge forming a slot therebetween, and a circular transparent column mounted in said slot and held by said pressed portions, said pointer swinging beneath said column.

7. In a gauge, a pointer mounted to swing on a pivot, means for moving said pointer, a dial having a slot at substantially its mid-portion formed by inwardly pressing oppositely disposed portions of said dial, a circular transparent column positioned at said slot, and means on said portions to retain said column.

8. In a gauge, a pointer mounted to swing on a pivot, means for moving said pointer, a dial having a slot at substantially its mid-portion formed by inwardly pressing oppositely disposed portions of said dial, a circular transparent column positioned at said slot, and curved tongues on said portions to retain said column.

In testimony whereof I affix my signature.

IVAR T. WEDIN.